United States Patent [19]
Inaba

[11] Patent Number: 5,282,068
[45] Date of Patent: Jan. 25, 1994

[54] LIQUID CRYSTAL DISPLAY WITH OPAQUE INSULATING LAYER AND METAL LAYER AT AND WIDER THAN INTER-ELECTRODE GAP AND METHOD OF MANUFACTURING

[75] Inventor: Yutaka Inaba, Kawaguchi, Japan

[73] Assignee: Canon Kabushiki Kaisha, Tokyo, Japan

[21] Appl. No.: 788,943

[22] Filed: Nov. 7, 1991

[30] Foreign Application Priority Data

Nov. 8, 1990 [JP] Japan .................. 2-301205
Oct. 31, 1991 [JP] Japan .................. 3-311493

[51] Int. Cl.$^5$ .................. G02F 1/1343; G02F 1/1335
[52] U.S. Cl. .................. 359/54; 359/67; 359/87
[58] Field of Search .............. 359/67, 87, 54

[56] References Cited

U.S. PATENT DOCUMENTS

| | | | |
|---|---|---|---|
| 4,561,726 | 12/1985 | Goodby et al. | 350/341 |
| 4,589,996 | 5/1986 | Inoue et al. | 252/299.65 |
| 4,592,858 | 6/1986 | Higachi et al. | 252/299.66 |
| 4,596,667 | 6/1986 | Inuki et al. | 252/299.65 |
| 4,613,209 | 9/1986 | Goodby et al. | 350/330 S |
| 4,614,609 | 9/1986 | Inoue et al. | 252/299.66 |
| 4,622,165 | 11/1986 | Kano et al. | 252/299.65 |
| 4,728,176 | 3/1988 | Tsuboyama et al. | 359/81 |
| 4,824,213 | 4/1989 | Morokawa | 359/57 |
| 5,132,816 | 7/1992 | Itoh et al. | 359/56 |
| 5,138,473 | 8/1992 | Dijon et al. | 359/67 |
| 5,150,233 | 9/1992 | Enomoto et al. | 359/54 |
| 5,161,043 | 11/1992 | Narutaki et al. | 359/67 |
| 5,187,601 | 2/1993 | Yamazaki et al. | 359/54 |

FOREIGN PATENT DOCUMENTS

| | | | |
|---|---|---|---|
| 0210325 | 9/1986 | Japan | 359/67 |
| 2146502 | 6/1990 | Japan | 359/68 |

OTHER PUBLICATIONS

Clark et al., "Appl. Phys. Lett." vol. 36, No. 11, pp. 899-901 (1980).
Meyer et al., "Journal de Physique—Lettres" vol. 36, pp. L69-L71 (1975).
Kotai, "Solid State Physics," vol. 16, pp. 13-23 (1981).

Primary Examiner—William L. Sikes
Assistant Examiner—Anita Pellman Gross
Attorney, Agent, or Firm—Fitzpatrick, Cella, Harper & Scinto

[57] ABSTRACT

A liquid crystal display cell, a method of manufacturing a liquid crystal cell, and a liquid crystal display apparatus are provided. The method includes an inter-electrode light-shielding pattern forming step of sequentially forming an opaque insulating layer and a metal layer in this order at an area corresponding in position to a gap between electrodes on the substrate, the opaque layer and the metal layer having a width slightly greater than the width of the gap, and an electrode forming step of forming a plurality of stripe transparent electrodes by forming a transparent conductive layer on the whole surface, patterning the transparent conductive layer so as to divide the metal layer into two parts, and providing the transparent electrodes lined with the divided metal layers on both sides of each of the transparent electrode in the longitudinal direction.

17 Claims, 6 Drawing Sheets

LIQUID CRYSTAL DISPLAY WITH OPAQUE INSULATING LAYER AND METAL LAYER AT AND WIDER THAN INTER-ELECTRODE GAP AND METHOD OF MANUFACTURING

BACKGROUND OF THE INVENTION

1. Field of the Invention

The present invention relates to a liquid crystal display cell having a pair of substrates disposed facing each other and crossed to provide pixels of a matrix arrangement, the substrate having stripe electrodes formed thereon, a method of manufacturing such a liquid crystal display cell, and a liquid crystal display apparatus. More particularly, the present invention relates to a ferromagnetic liquid crystal cell in which electrode resistance is reduced with a light-shield in the area between pixels, a method of manufacturing such a ferromagnetic liquid crystal cell, and a ferromagnetic liquid crystal display apparatus.

2. Related Background Art

The screen size of a liquid crystal display apparatus is becoming larger nowadays. As the display panel increases, there arise serious problems of heat generation caused by electrode resistance and voltage waveform delay. In order to reduce electrode resistance, the sheet resistance ps of a transparent conductive layer constituting an electrode should be reduced. A commonly used ITO has $\rho s$ of 10 $\Omega$/square at most. However, the narrower electrodes that will be used in for high precision display panels and color displays make reducing electrode resistance impossible. In view of this electrode resistance is expected to be reduced by forming supplemental electrodes along each transparent electrode. A substrate obtained by using this method is shown in FIG. 4.

Figure 4:
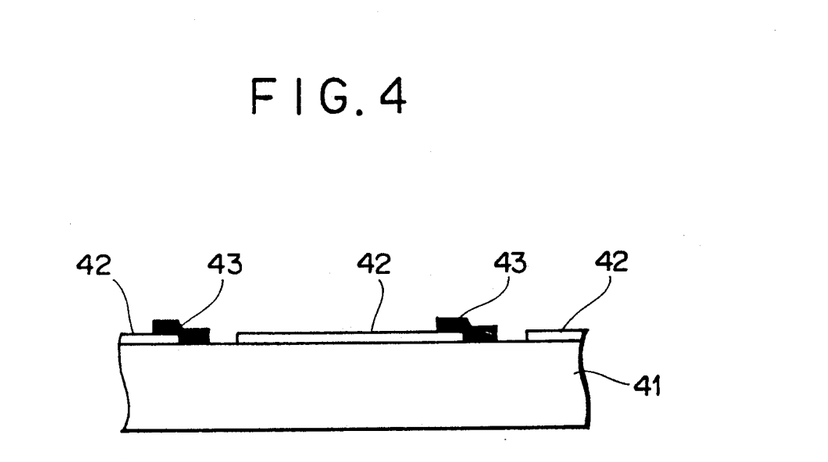
FIGS. 4 and 5 are cross sections showing the structure of conventional liquid crystal cell substrates.

In FIG. 4, transparent electrodes 42 such as ITO are formed on a glass substrate 41, in a stripe configuration. Narrow metal layers 43 are formed on the transparent electrode 42 in the longitudinal direction. As the metal layer 43, Al, Cr, Mo or the like is used generally. Presence of the metal layers reduces the electrode resistance by one or two magnitudes than when only ITO is used.

This method is however associated with the following disadvantages. The first disadvantage is that it requires high patterning precision because the metal film 43 should be isolated electrically from adjacent electrodes 42. For example, in FIG. 4, if the transparent electrodes 42 are 200 $\mu$m thick with the space therebetween being 20 $\mu$m and the metal layers 43 are 20 $\mu$m thick, then in order to broaden an effective pixel area, the metal layers 43 are required to be patterned relative to the ITO electrode 42 at an alignment precision of 10 $\mu$m or less, preferably 5 $\mu$m. If the alignment precision is 10 $\mu$m, the effective pixel width is 190 $\mu$m, and if it is 5 $\mu$m, the effective pixel width is 195 $\mu$m. However, high precision masks and an aligner must be prepared to improve the patterning precision, resulting in high cost.

Figure 5:
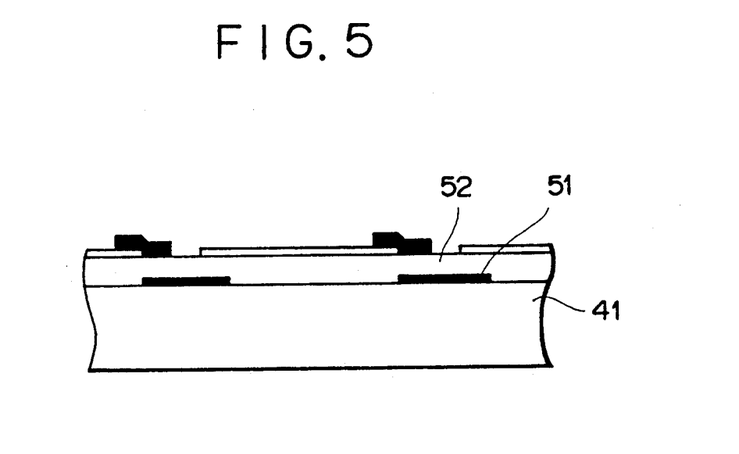

The second disadvantage is that light-shielding between pixel is incomplete. In the arrangement, shown in FIG. 4, the metal film 43 covers half or more of the area between pixels, but it cannot cover the whole area between pixels. Therefore, it is necessary to provide an additional light-shielding film. As shown in FIG. 5, a metal light-shielding pattern 51 is first formed and then an insulating transparent resin, 52 is coated thereof. Thereafter, the electrode and metal film are formed like in FIG. 4. However, this method requires increased patterning steps.

SUMMARY OF THE INVENTION

In consideration of the above-described related art, it is an object of the present invention to provide an inexpensive method of manufacturing a liquid crystal cell capable of reducing electrode resistance while completely light-shielding an area between electrodes. The present invention also provides a liquid crystal cell manufactured by that method, and a liquid crystal display apparatus.

In order to solve the above disadvantages of the related art, according to the present invention, a laminated layer comprised by an insulating light-shielding layer and a metal layer is formed at an area corresponding in position to a gap between electrodes on the substrate, the laminated layer having a width slightly greater than the width of the gap and the metal layer being formed above the insulating light-shielding layer. Thereafter, there is formed a transparent conductive layer on the whole surface, and the transparent conductive layer is patterned so as to divide the metal layer into two parts in the longitudinal direction.

DETAILED DESCRIPTION OF THE PREFERRED EMBODIMENTS

Figure 6A:
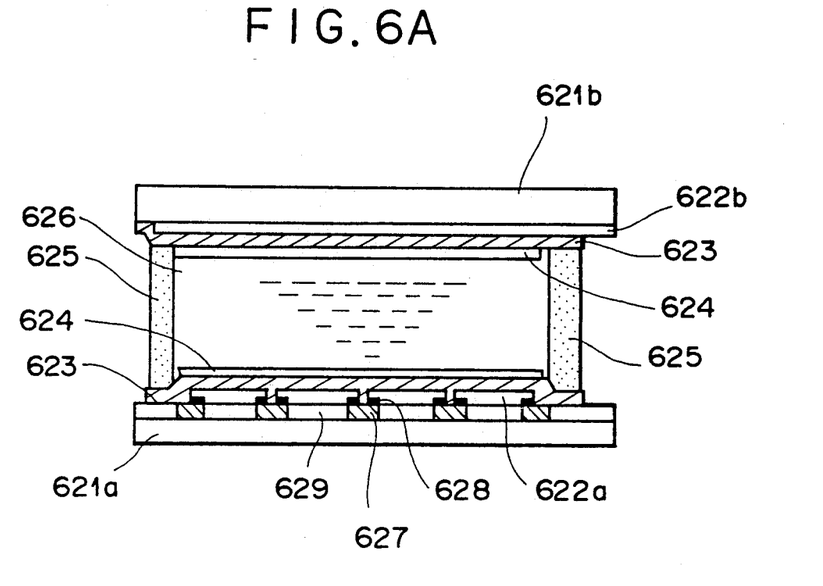
FIGS. 6A and 6B are a schematic cross section showing a liquid crystal cell according to the present invention, and its plan view showing one side surface thereof.
Figure 6B:
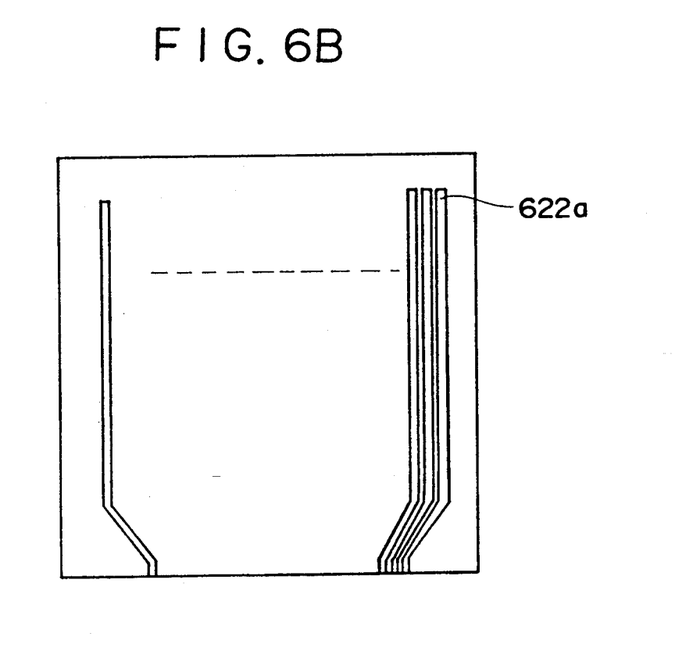

A liquid crystal cell of the present invention is constructed as shown in FIGS. 6A and 6B. This liquid crystal cell has a pair of substrates 621a and 621b made of glass plate or plastic plate. The substrates are supported using adhesive agent 625 so that they face each other and are spaced by a predetermined distance. Liquid crystal 626 is filled in the space defined by the two substrates. An electrode group comprised by a plurality of transparent electrodes 622a (e.g., a common electrode group for applying a scan voltage) is formed on the substrate 621a in a predetermined pattern such as a stripe pattern. Another electrode group comprised by a plurality of transparent electrodes 622b (e.g., a segment electrode group for applying a signal voltage) is formed on the substrate 621b in a predetermined pattern such as a stripe pattern. The transparent electrodes 622a and 622b are crossed to provide a matrix electrode pattern.

An insulating film 623 and orientation film 624 are formed on at least one of the substrates 621a and 621b.

Each of the transparent electrodes 622a and 622b has two metal electrode layers 628 disposed at opposite sides thereof in the longitudinal direction. Below the electrode group comprised by the transparent electrodes 622a, there are formed insulating/light-shielding layers 627 and transparent resin layers 629 at positions corresponding to the respective two metal electrode layers 628 and the transparent electrodes 622a, respectively.

The orientation control film 624 is made of inorganic or organic insulating material. The inorganic insulating material includes, for example, silicon monooxide, silicon dioxide, aluminum oxidezirconia, magnesium fluoride, ceric oxide, ceric fluoride, silicon nitride, silicon carbide, and boron nitride. The organic insulating material includes, for example, polyvinyl alcohol, polyimide, polyamide imide, polyester imide, poly-paraxylyene, polyester, polycarbonate polyvinyl acetate, polyvinyl chloride, polyamide, polystyrene, cellulosic resin, melamine resin, urea resin, and acrylic resin. A film made of such inorganic insulating material may be used as an insulating film.

The surface of the orientation control film 624 made of material described above is rubbed in one direction with velvet, cloth, or paper, to thereby provide an uniaxial orientation axis in the direction same as the rubbing direction.

The cross angle of the uniaxial axes for the upper and lower substrates is set to a desired value depending on the cell structure and the type of liquid crystal. In general, the cross angle is selected within the range of 0° (parallel) to 40°, more preferably within the range of 2° to 25°.

The insulating film 623 is 200 angstroms or more, preferably 500 angstroms or more. The film 623 is made of an inorganic insulating film such as $SiO_2$, $TiO_2$, $Al_2O_3$, $Si_3N_4$ and $BaTiO_3$. As a method of forming a film, there is used a sputtering method, an ion beam evaporation method, or a method of sintering a film made by coating an organic titanium compound, organic silane compound, or organic aluminum compound. As the organic titanium compound, alkyl (methyl, ethyl, propyl, butyl, and so on) and titanate compound may be used. As the organic silane compound, silane coupling agent may be used.

If the thickness of the insulating film 623 is 200 angstroms or less, it is not possible to reliably prevent a short-circuit. If the thickness is 5000 angstroms or more, there is no effective voltage to be applied to a liquid crystal layer. Therefore, the thickness of the insulating film 623 is set to 5000 angstroms or less, preferably 2000 angstroms or less.

A liquid crystal particularly suitable for use with the present invention is a ferroelectric chiral smectic liquid crystal. For example, there are used liquid crystals of chiral smectic C-phase (SmC*), chiral smectic G-phase (SmG*), chiral smectic F-phase (SmF*), chiral smectic I-phase (SmI*), and chiral smectic H-phase (SmH*).

The details of ferroelectric liquid crystal are described, for example, in "Ferroelectric liquid Crystals", Le Journal de Physique Letters 36 (L-69), 1975; "Submicro Second Bi-stable Electrooptic Switching in Liquid Crystals", Applied Physics Letters 36 (11); "Liquid Crystal", Solid Physics 16 (141), 1981; U.S. Pat. Nos. 4,561,726, 4,589,996, 4,592,858, 4,596,667, 4,613,209, 4,614,609 and 4,622,256. These disclosed ferroelectric liquid crystals may be used in the present invention.

The ferroelectric liquid crystal compound includes, for example, decyloxybenzylidene-p'-amino-2-methylbutylcinnamate (DOBAMBC), hexyloxybenzylidene-p'-amino-2-chloropropylcynnamate (HOBACPC), and 4-o-(2-methyl) butylresorcylidene-4'-octylaniline (MBR8).

The insulating/light-shielding layer 627 may be formed with opaque resin, or it may be a two-layer insulating/light-shielding layer made of an insulating resin layer on a metal light-shielding layer.

According to the liquid crystal cell described above, a strip electrode group comprised by a plurality of transparent electrodes 622a and 622b is formed on each of the two substrates facing each other and being spaced apart by a predetermined distance. Each transparent electrode has two metal layers 628 at opposite sides thereof in the longitudinal direction. Gaps between transparent electrodes are light-shielded. Liquid crystal is filled in the space between the two substrates. The electrode groups are crossed to provide a matrix electrode pattern so that each pair of confronting transparent electrodes for the two substrates constitutes a pixel.

The resistance of each transparent electrode 622a, 622b is reduced by the lined metal layers 628. The area between pixels is light-shielded by a light-shielding layer 627. The effective pixel area is determined by a distance between adjacent metal layers 628 (i.e., between adjacent light-shielding layers 627). These layers can be formed using the same mask, so there is no problem in association with patterning alignment precision. Although the width of each lining metal layer 628 for the transparent electrodes 622a and 622b is determined by an alignment precision, the total width of right and left metal layers 628 depends less on the patterning alignment precision. It is therefore unnecessary to set the alignment precision so high, thereby reducing manufacturing cost.

EMBODIMENTS

Embodiments of the present invention will be described with reference to the accompanying drawings.

First Embodiment

FIGS. 1A to 1E show the steps of manufacturing a liquid crystal cell substrate according to an embodiment of the present invention.

In this embodiment, an inter-pixel pattern is defined by a laminated layer of an opaque resin layer 14 and a metal layer 15 formed on a substrate 11. When an ITO layer 16 formed on the metal layer 15 is etched, the underlying metal layer 15 is also etched using the same patterned mask. In this manner, the transparent electrode 16, lining metal layer 15, and light-shielding layer 14 are formed.

A liquid crystal cell substrate is manufactured by the steps shown in FIGS. 1A to 1E.

Figure 1A:
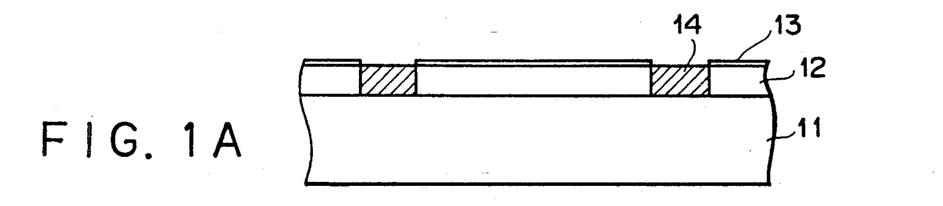
FIGS. 1A to 1E show the steps of manufacturing a liquid crystal cell according to a first embodiment of the present invention.

(A) Light-shielding Layer Forming Step shown in FIG. 1A: A polyvinyl alcohol (PVA) film 12 about 1 μm thick is formed on a substrate 11. After a resist pattern 13 is formed, the substrate is dipped in coloring liquid to color a predetermined area 14.

Figure 1B:
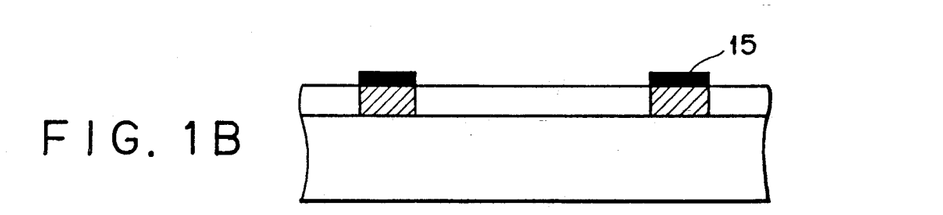
Figure 1C:
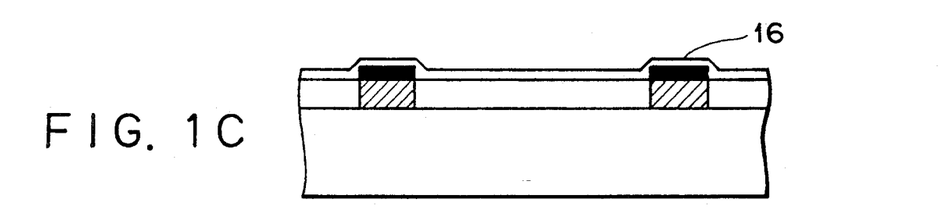

(B) Metal Layer Forming Step shown in FIG. 1B: After an aluminum film 15 is evaporated on the surface of the substrate, the resist film 13 is removed. The aluminum film 15 at the area outside of the colored area is lifted off.

(C) Step shown in FIG. 1B: An ITO film 16 of about 100 angstroms thickness is sputtered on the surface of the substrate.

Figure 1D:
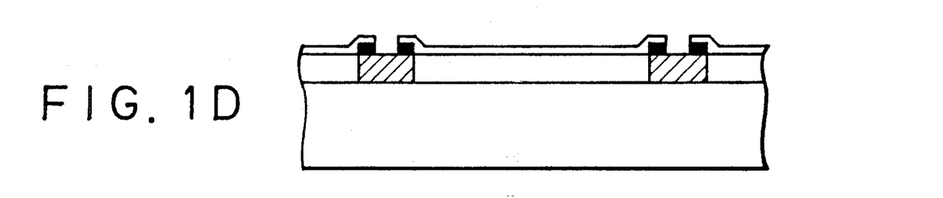

(D) Patterning Step shown in FIG. 1D: A resist pattern is formed and the substrate is dipped in etchant. Two etching processes are carried out. First, the substrate is dipped in aqueous solution of hydroiodic acid to remove the ITO 16. Then, it is dipped in aqueous solution of a mixture of phosphoric acid, nitric acid, and acetic acid to remove the aluminum film.

Figure 1E:
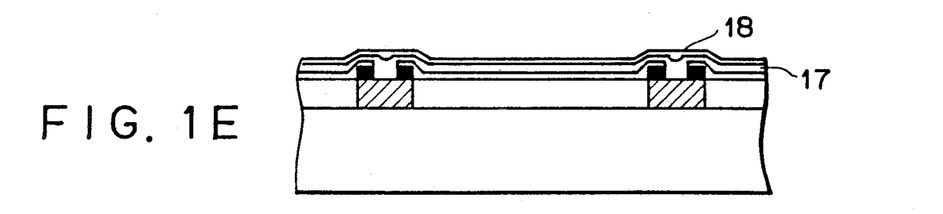

(E) Step shown in FIG. 1E: An insulating film 17 is formed using a $Ta_2O_5$ film or a $TiO_2+SiO_2$ film. An orientation film (polyimide) 18 is coated. Rubbing is performed for crystal orientation.

Figure 2A:
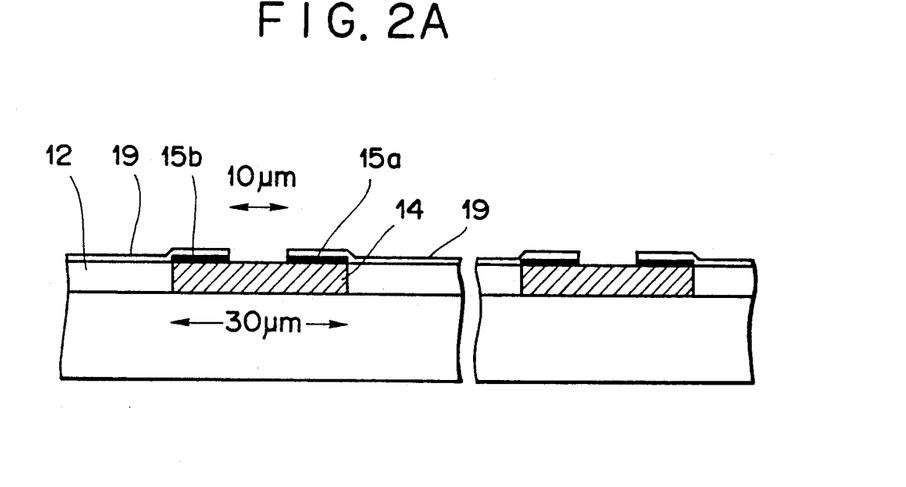
FIGS. 2A and 2B illustratively show the effects of the manufacturing method shown in FIGS. 1A to 1E.
Figure 2B:
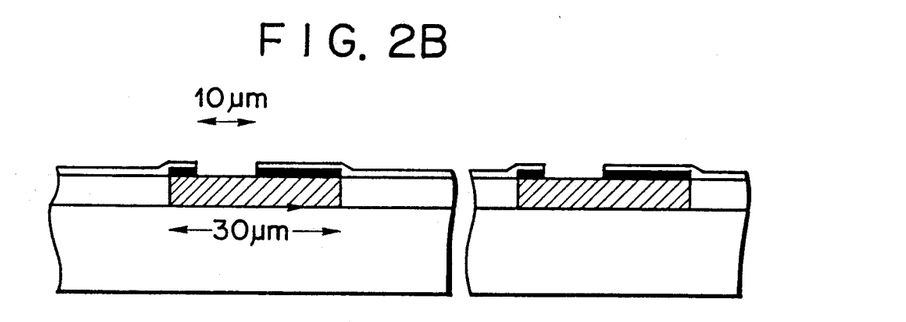

According to this embodiment, the opaque resin layer and metal film are first laminated as the same pattern. Therefore, patterning processes are executed only twice. Conventionally, three patterning processes are required for forming a light-shielding film, opaque electrode, and metal layer. Furthermore, the ITO is patterned so as to divide the metal film into two parts, so that the wiring resistance changes less even if the alignment precision is not so good. For example, as shown in FIG. 2A, if the opaque resin layers 14 are to be made 30 µm thick, and if the transparent electrodes 19 are to be made 210 µm thick with a space therebetween being set to 10 µm, then it is sufficient if the patterning alignment precision for ITO is set ±10 µm. Even if patterning alignment is shifted more or less as shown in FIG. 2B, the total width of right and left metal layers 15a and 15b is kept constant at 20 µm, and so the wiring resistance is also kept constant. The effective pixel width is determined by the patterning of the opaque resin layer and metal layer (in this case, 190 µm), and it is not adversely influenced by a shift of ITO patterning.

Second Embodiment

FIGS. 3A to 3F show the steps of manufacturing a liquid crystal cell substrate according to a second embodiment. Like elements to those shown in FIGS. 1A to 1E are represented by using identical reference numerals. Different from the first embodiment, in the second embodiment, a metal film light-shielding layer is formed on which a resistance reducing metal layer and an electrode are formed.

A liquid crystal cell substrate is manufactured by the steps shown in FIGS. 4A to 4F.

Figure 3A:
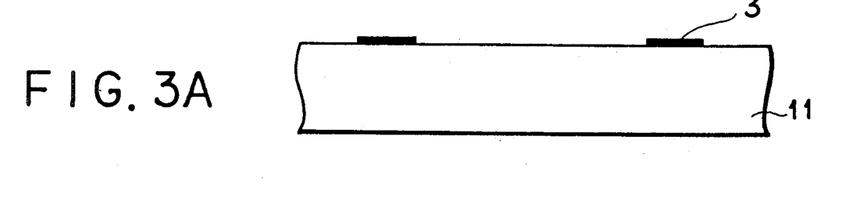
FIGS. 3A to 3F show the steps of manufacturing a liquid crystal cell according to a second embodiment of the present invention.

(A) A chrome film 3 of 300 angstroms thickness is formed on a substrate 11. The film is patterned to obtain a light-shielding metal layer.

Figure 3B:
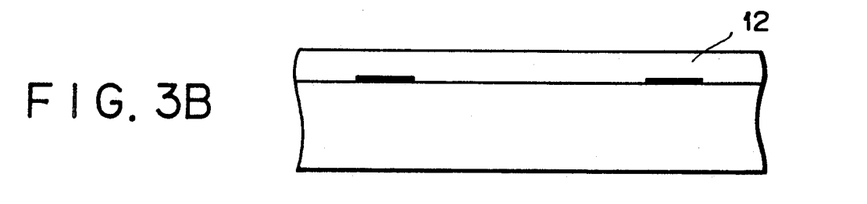

(B) A polyimide resin 12 of 1 µm thickness is coated as an insulating member.

Figure 3C:
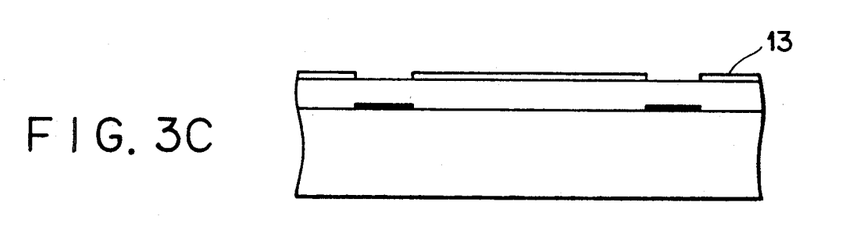

(C) A positive resist 13 is coated upon which light is applied from the glass substrate 11 side. The resist only above the chrome film is removed.

Figure 3D:
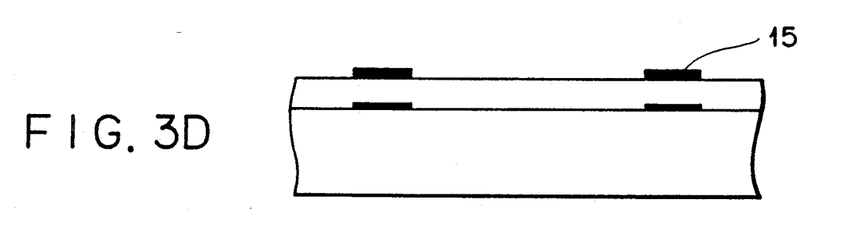

(D) An aluminum film 15 of 300 angstroms thickness is formed. Thereafter, the resist film is removed and the aluminum film 15 only above the light-shielding pattern is lifted off.

Figure 3E:
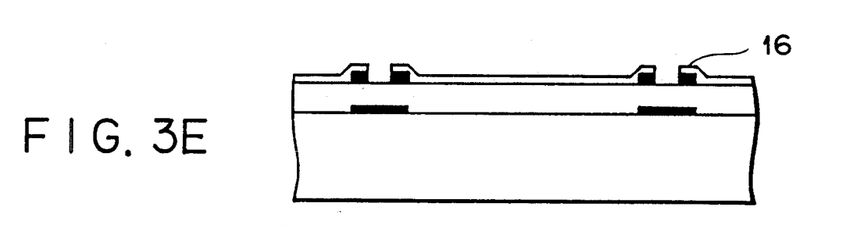

(E) An ITO 16 of 1000 angstroms thickness is formed. Thereafter, similar to the first embodiment, the ITO and aluminum film are patterned.

Figure 3F:
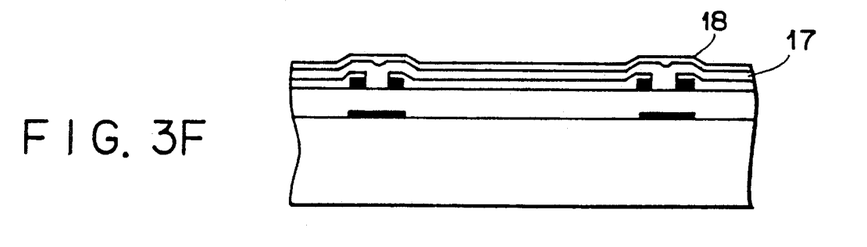

(F) An insulating film 17 is formed using a $Ta_2O_5$ film. An orientation film 18 is formed using polyimide. The cell fabrication is performed after rubbing.

In this embodiment also, patterning processes are executed twice, and the mask alignment precision is sufficient if the same precision as the first embodiment is set.

As described above, after laminating the light-shielding insulating layer and metal layer, an ITO is formed over the whole surface of the substrate. Thereafter, the ITO is patterned so as to divide the metal film into two parts, so that the photolithography processes become simplified and the effective pixel area and electrode resistance can be properly set even with a low mask alignment precision.

Third Embodiment

Figure 7:
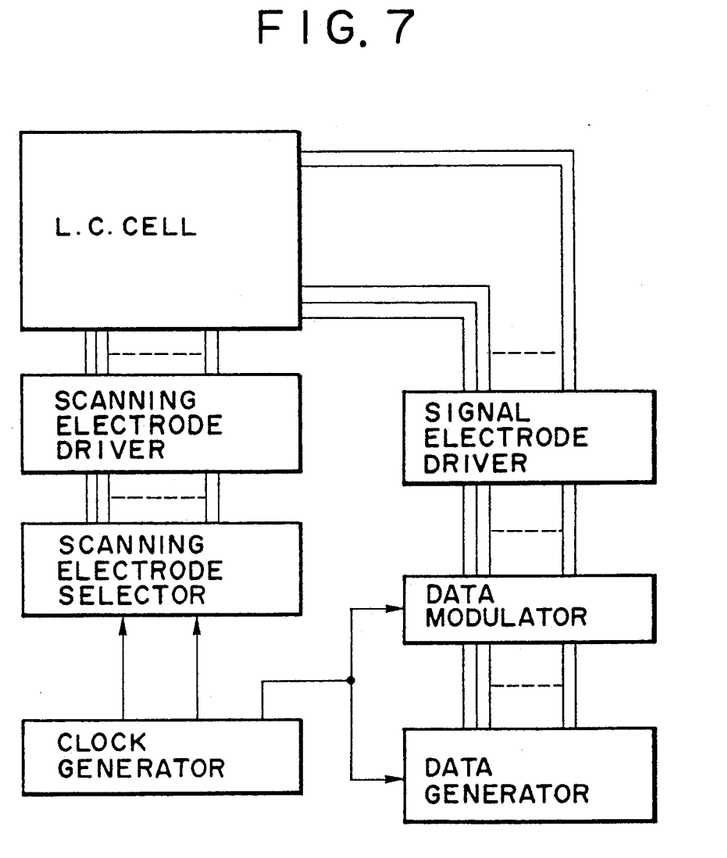
FIG. 7 shows an example of an electric circuit for driving a liquid crystal cell according to the present invention.

FIG. 7 shows an example of a simplified electronic circuit for driving a liquid crystal cell manufactured according to the present invention. Clock signals (CS) generated by a clock generator are supplied to a scan electrode selector which selects scan electrodes. The scan electrode selector sends a signal to a scan electrode driver to drive a scan electrode group. In response to the clock signal (CS), a data generator supplies a data signal to a data modulator which generates an information signal and an auxiliary signal. The signals are supplied to a signal electrode driver which in turn drives a signal electrode group.

An image of a good quality could be displayed using the above-described liquid crystal display apparatus.

What is claimed is:

1. A liquid crystal display cell comprising a pair of substrates, each substrate being provided with transparent stripe electrodes, the substrates being disposed facing each other with the strip electrodes crossed to provide pixels in a matrix arrangement;

each substrate further comprising a pattern of interelectrode light shields corresponding in position to gaps between said stripe electrodes, the lightshields being formed of an opaque insulating layer and a metal layer, said opaque layer and said metal layer having a width slightly greater than the widths of said gaps;

wherein each of said metal layers is divided into two parts so as to line each longitudinal side of each of said transparent stripe electrodes with one part of said divided metal layers.

2. A liquid crystal device according to claim 1, wherein said liquid crystal is ferroelectric liquid crystal.

3. A liquid crystal device according to claim 1, further comprising an insulating film and orientation film formed on said transparent stripe electrodes.

4. A liquid crystal display apparatus comprising a liquid crystal device as claimed in claim 1, a clock generator, a scan electrode selector, a scan electrode driver, a data generator, a data modulator and a signal electrode driver.

5. A liquid crystal display apparatus according to claim 4, wherein said liquid crystal is ferroelectric liquid crystal.

6. A liquid crystal display cell comprising a pair of substrates, each substrate being provided with transparent stripe electrodes, the substrates being disposed facing each other with the stripe electrodes crossed to provide pixels in a matrix arrangement;

each substrate further comprising a pattern of interelectrode light shields corresponding in position to gaps between said stripe electrodes, said lightshields being formed of two metal layers and a transparent insulating layer interposed between said two metal layers, at least one of said metal layers having a width slightly greater than the widths of said gaps;

wherein each of said metal layer which contacts said transparent conductive layer is divided into two parts so as to line each longitudinal side of each of said transparent stripe electrodes with one part of a divided metal layer.

7. A liquid crystal device according to claim 6, wherein said liquid crystal is ferroelectric liquid crystal.

8. A liquid crystal device according to claim 6, further comprising an insulating film and orientation film formed on said transparent stripe electrode.

9. A liquid crystal device according to claim 6, wherein the one of said two metal layers which contacts the substrate is made of chromium.

10. A liquid crystal display apparatus comprising a liquid crystal device as claimed in claim 6, a clock generator, a scan electrode selector, a scan electrode driver, a data generator, a data modulator and a signal electrode driver.

11. A liquid crystal display apparatus according to claim 10, wherein said liquid crystal is ferroelectric liquid crystal.

12. A method of manufacturing a liquid crystal display cell having a pair of substrates, each substrate being provided with transparent stripe electrodes, the substrates being disposed facing each other with the stripe electrodes crossed to provide pixels in a matrix arrangement, said method comprising:
   a step of forming on each of said pairs of substrates a pattern of inter-electrode light-shields by sequentially forming an opaque insulating layer and a metal layer in this order at plural areas corresponding in position to gaps between said stripe electrodes, said opaque layer and said metal layer at each gap having a width slightly greater than the width of said gap; and
   a step of forming said stripe electrodes by forming a transparent conductive layer on the light shields and the area between said light shields, patterning said transparent conductive layer into said stripe electrodes and dividing each of said metal layers into two parts so as to line each longitudinal side of each of said transparent stripe electrodes with one part of a divided layer.

13. Method according to claim 12, wherein said cell is a ferroelectric liquid crystal cell.

14. Method according to claim 12, further comprising a step of forming an insulating film and orientation film on said transparent stripe electrode.

15. Method according to claim 14, further comprising a step of rubbing said orientation film.

16. A method of manufacturing a liquid crystal display cell having a pair of substrates, each substrate being provided with transparent stripe electrodes, the substrates being disposed facing each other with the stripe electrode crossed to provide pixels in a matrix arrangement, said method comprising:
   a step of forming on each of said pair of substrates a pattern of inter-electrode light-shielding elements by forming two metal layers at an area corresponding in position to a gap between said electrodes on said substrate and a transparent insulating layer between said two metal layers, said metal layers having a width slightly greater than the width of said gap; and
   a step of forming said stripe electrodes on each substrate by forming a transparent conductive layer, patterning said transparent conductive layer so as to divide the metal layer which contacts said transparent conductive layer into two parts such that each of said transparent stripe electrodes is lined with one part of a divided metal layer on each longitudinal side of each of said transparent electrodes.

17. Method according to claim 16, wherein the one of said two metal layers which contacts the substrate is made of chromium.

* * * * *

UNITED STATES PATENT AND TRADEMARK OFFICE
CERTIFICATE OF CORRECTION

PATENT NO. : 5,282,068
DATED : January 25, 1994
INVENTOR(S) : YUTAKA INABA

It is certified that error appears in the above-identified patent and that said Letters Patent is hereby corrected as shown below:

ON TITLE PAGE

In [56] References Cited, under U.S. PATENT DOCUMENTS:

"Inuki et al." should read --Inukai et al.--.

In [56] References Cited, under FOREIGN PATENT DOCUMENTS:

"0210325  9/1986  Japan" should read
--61-210325  9/1986  Japan--; and
"2146502  6/1990  Japan" should read
--2-146502  6/1990  Japan--.

In [57] ABSTRACT, Line 17:

"electrode" should read --electrodes--.

COLUMN 1

Line 33, "this" should read --this,--.
Line 38, "substrate 41,in" should read --substrate 41 in--.
Line 61, "pixel" should read --pixels-- and
         "arrangement," should read --arrangement--.
Line 67, "resin, 52" should read --resin 52--.

COLUMN 2

Line 15, "by" should read --of--.
Line 54, "by" should read --of--.
Line 58, "by" should read --of--.

UNITED STATES PATENT AND TRADEMARK OFFICE
CERTIFICATE OF CORRECTION

PATENT NO. : 5,282,068
DATED : January 25, 1994
INVENTOR(S) : YUTAKA INABA

It is certified that error appears in the above-identified patent and that said Letters Patent is hereby corrected as shown below:

COLUMN 3

Line 1, "by" should read --of--.
Line 9, "monooxide," should read --monoxide,--.

COLUMN 4

Line 8, "strip" should read --stripe-- and "by" should read --of--.

COLUMN 5

Line 26, "constant" should read --constant.--.

COLUMN 6

Line 24, "strip" should read --stripe--.
Line 63, "layer" should read --layers--.

COLUMN 8

Line 2, "divided" should read --divided metal--.
Line 3, "Method" should read --A method--.
Line 5, "Method" should read --A method--.
Line 8, "Method" should read --A method--.

UNITED STATES PATENT AND TRADEMARK OFFICE
CERTIFICATE OF CORRECTION

PATENT NO. : 5,282,068
DATED : January 25, 1994
INVENTOR(S) : YUTAKA INABA

It is certified that error appears in the above-identified patent and that said Letters Patent is hereby corrected as shown below:

COLUMN 8

Line 14, "electrode" should read --electrodes--.
Line 33, "Method" should read --A method--.

Signed and Sealed this

Thirtieth Day of August, 1994

Attest:

BRUCE LEHMAN

Attesting Officer          Commissioner of Patents and Trademarks